United States Patent [19]

Kyoden et al.

[11] Patent Number: 4,636,969
[45] Date of Patent: Jan. 13, 1987

[54] APPARATUS FOR AUTOMATIC MEASURING THERMAL DIMENSIONAL CHANGE

[75] Inventors: Hiroshi Kyoden, Okayama; Yasuhiro Endo, Bizen; Teiichi Fujiwara; Toshisada Mimura, both of Okayama; Kihachiro Nishikawa; Shoichi Nishizawa, both of Yokohama, all of Japan

[73] Assignees: Shinagawa Refractories Co., Ltd.; Matsushita Electric Industrial Co., Ltd., both of Japan

[21] Appl. No.: 776,920

[22] Filed: Sep. 17, 1985

Related U.S. Application Data

[63] Continuation-in-part of Ser. No. 636,263, Jul. 31, 1984, abandoned.

[30] Foreign Application Priority Data

Aug. 15, 1983 [JP] Japan ............................. 58-147966
Jun. 22, 1984 [JP] Japan ............................. 59-127526

[51] Int. Cl.$^4$ ............................................. G01B 11/02
[52] U.S. Cl. ................................... 364/560; 250/560; 356/386; 374/55
[58] Field of Search .................... 374/130, 55, 56, 17, 374/19; 356/5, 6, 7, 43, 44, 49, 213, 229, 399, 400; 350/502, 454; 364/560

[56] References Cited

U.S. PATENT DOCUMENTS

| | | | |
|---|---|---|---|
| 3,433,051 | 3/1969 | Parker | 374/56 |
| 4,173,788 | 11/1979 | Laliotis | 364/560 |
| 4,271,477 | 6/1981 | Williams | 250/560 X |
| 4,381,152 | 4/1983 | Riech et al. | 250/560 X |
| 4,426,160 | 1/1984 | Couderc | 374/55 |
| 4,468,136 | 8/1984 | Murphy et al. | 374/57 X |
| 4,522,510 | 6/1985 | Rosencwarg et al. | 356/5 |

FOREIGN PATENT DOCUMENTS

0729493 4/1980 U.S.S.R. ............................. 374/55

OTHER PUBLICATIONS

"Measurement of Thermal Expansion at High Temps by Laser Interferometry of Two Fibers", Review of Scientific Instruments, Hollenberg et al, vol. 47, 12/1976; pp. 1536-1541.

"An Automated Optical Dilatometer for Inhomogeneously Expanding Material" AIP Conference Proceedings (USA), Blankinship et al, No. 17; 1973; pp. 167-176.

*Primary Examiner*—Daniel M. Yasich
*Attorney, Agent, or Firm*—Larson and Taylor

[57] ABSTRACT

An apparatus for automatic measuring thermal dimensional change from the room temperature to 2,000° C., comprising, (a) means for supporting a specimen of the material to be tested and heating said specimen, (b) means for measuring the dimensional change of the specimen during heating said specimen, said measuring means having photo diode linear array and the telescopic lens for forming an image of the heated specimen, (c) means for illuminating the specimen from the opposite side of the photo diode linear array, said means having electric lamp and condensor lens, the radiation characteristic curve of said lamp being different from that of heated specimen, (d) means for separating the light forming image from the light radiated from said heated specimen, said means having light filter and neutral density filter between said specimen and said optical lens, (e) means for processing and calculating the video signal from the photo diode linear array indicating the results of measurements.

5 Claims, 17 Drawing Figures

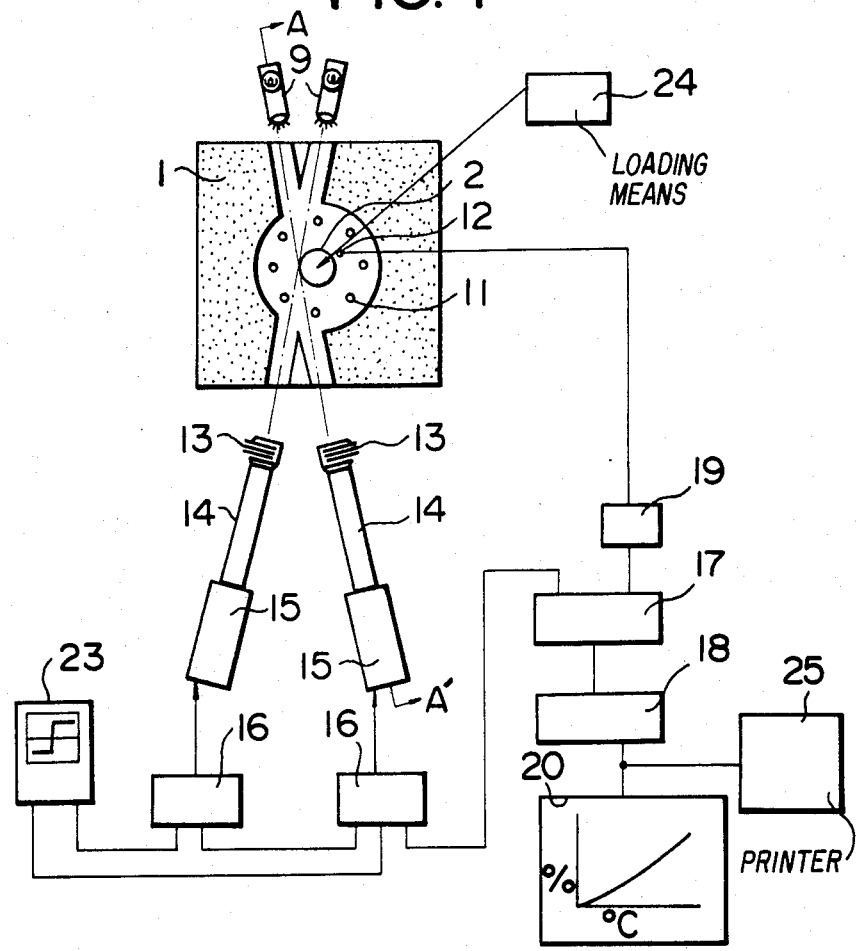
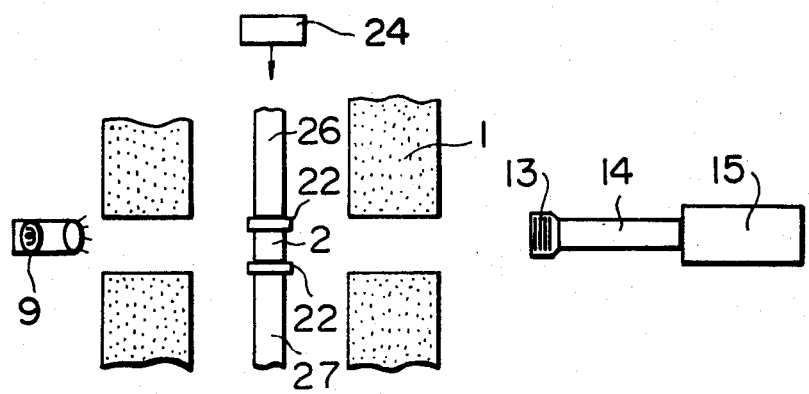

APPARATUS FOR AUTOMATIC MEASURING THERMAL DIMENSIONAL CHANGE

This is a continuation in part of application Ser. No. 636,263, filed July 31, 1984, (now abandoned).

This invention relates to a thermal deformation measuring system of ceramics and the like, in which there is measured in non-contact type, precisely and automatically the deformation [such as thermal linear expansion coefficient (hereinafter referred to as thermal expansion coefficient) or creep deformation rate] mainly of ceramics and the like under high temperature.

By "deformation" referred to in the specification is meant the dimensional change and the change in shape of the specimen to be measured.

The thermal expansion coefficient of fine ceramics, refractories, pottery and porcelain, glass or ceramics of composite materials thereof with metal, or various kinds of metals, and particularly the thermal expansion coefficient of refractories is one of the most important properties, which guides the determination of expansion joint of the lining refractories of furnace used in the hot state.

Conventionally, as standardized in JIS R 2617 and JIS R 2207, as shown in FIG. 13, thermal expansion coefficient is measured and calculated under contact type or non-contact type system, of which the contact type is such that a specimen 2 placed on a specimen holder 4 provided within an electric furnace 1 is contacted with a deformation detector or tube 3 thereby to detect the expansion or contraction of the specimen, and the deformation is read either by dial gauge or by deformation measuring means 6 of differential transformer type, or the deformation is once recorded in a recorder 7 and after measurement it is read from the curve thereby to calculate the expansion coefficient, as shown in FIG. 13 wherein reference 5 designates a differential transformer, reference 11 a heater and reference 12 a thermocouple.

According to this method, however, the specimen is contacted with a detecting bar when a measuring pressure is applied, and therefore in the case of a specimen which is softened at high temperature the specimen itself is deformed by the compressive force caused by the measuring pressure, and it was difficult to measure the true expansion coefficient. Further, in such case it was often required to compensate the difference of expansion rate between the specimen holder and the deformation detector, thereby causing errors.

Accordingly, these days there is adopted a method of measuring specimens with non-contact type. As one of the methods of non-contact type measuring there is mentioned such one as in FIG. 14 that the deformation of both the ends of a specimen 2 placed in the electric heater 1 is directly read out through a graduated telescope 10. According to this method, light and dark distinction of the specimen and atmosphere is hardly produced when the interior of the furnace is at high temperature, so that reading is difficult and much relies on experience thereby causing measuring errors. Further, in the data thus obtained it was necessary to calculate the change ratio to the original length of the specimen and to show the relationship between the temperature and the expansion coefficient in a drawing. In FIG. 14 numeral 8 designates a thermometer, 9 an illuminator, 11 a heater, and 12 a thermocouple.

Furthermore, as another non-contact type method of measuring a specimen there is mentioned such one that the deformation of the specimen at each temperature is photographed with a camera with graduated telescopic lens so as to read the deformation of the specimen from the photographs, but this method requires a lot of time for data processing so as to be questionable from the efficiency point of view.

Moreover, it is necessary to know in designing a structure the compressive creep deformation rate of ceramics and the like, and it is wellknown to the skilled in the art that the deformation for longer period of time under loading in the hot state is one of the most important properties as guidance of furnace designing.

Conventionally one example of the measurement of creep deformation rate is standardized in R 6-78 of PRE (European Community Standard). This measurement is a so-called contact type, according to which the deformation of the specimen placed on a holder and a refractory disk provided within the electric furnace is transferred by a displacement detecting tube, the deformation is measured for recordal by transfer dimension-measuring means connectable with a recorder, and the deformation is directly read from the curve after measurement when the creep deformation rate is calculated.

In this case the pressure is loaded by pressurizing means from a loading tube when the temperature of each of the interior and exterior of the specimen is measured by a thermocouple each therefor.

However, since this method is of differential type, sometimes temperature difference occurs between the specimen 2 and the deformation detecting tube 3 or the deformation detecting tube itself is softened and deformed due to high temperature thereby to cause errors. This necessitates a method of directing measuring the deformation without using a differential bar.

The inventors of this invention have made various studies to improve the above drawbacks of known types, and as a result they have been successful in developing a thermal deformation measuring system of ceramics and the like, which system can effect automatic and highly precise measuring.

The present invention relates to an apparatus for automatically measuring the dimensional change of a specimen in the temperature range from the room temperature to 2,000° C., comprising the following featuring means:

(a) means for supporting a specimen of the material to be tested and heating said specimen, (b) means for measuring the dimensional change of the specimen during heating said specimen, said measuring means having photo diode linear array and the telescopic lens for forming an image of the heated specimen, (c) means for illuminating the specimen from the opposite side of the photo diode linear array, said means having electric lamp and condensor lens, the radiation characteristic curve of said lamp being different from that of heated specimen, (d) means for separating the light forming image from the light radiated from said heated specimen, said means having light filter and neutral density filter between said specimen and said optical lens, (e) means for processing and calculating the video signal from the photo diode linear array indicating the results of measurements.

The invention will now be described more in detail with reference to the accompanying drawings, in which FIG. 1 is a schematic drawing showing the dispositional relation of an embodiment in which the deformation measuring system of the invention is applied to means for measuring the thermal expansion coefficient;

FIG. 7 is a schematic drawing which shows a dispositional relation of an embodiment of applying the deformation measuring system of the invention to a creep measuring device;

FIG. 8 is a schematic side elevational drawing of the essential portions of FIG. 7.;

An embodiment in which the thermal deformation measuring system of ceramics and the like according to the invention is now described in detail with reference to FIG. 1.

Figure 1:
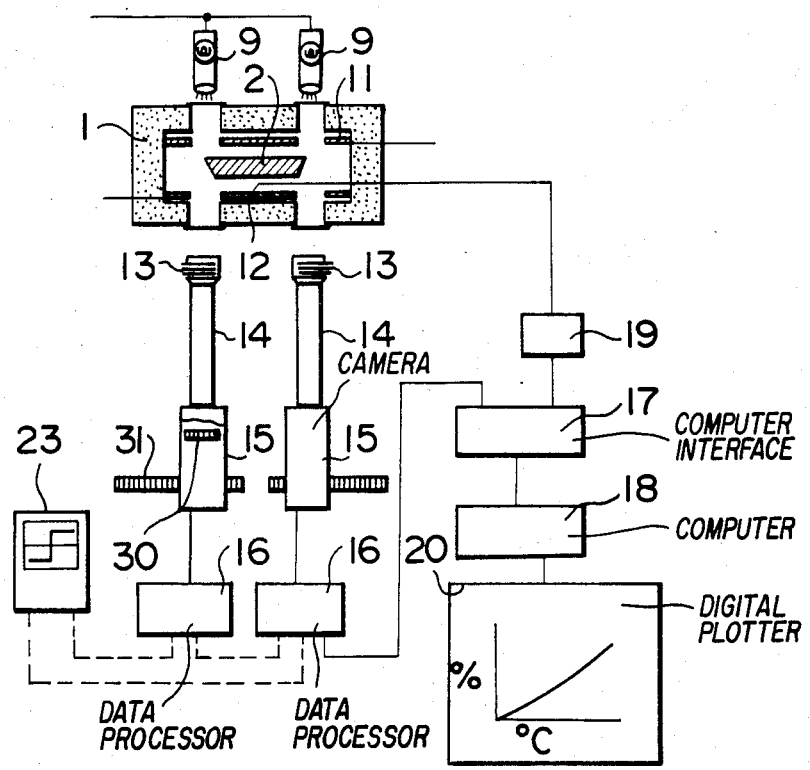

As shown in FIG. 1, a specimen 2 is illuminated at both its ends by an illuminator 9 from the direction rectiangular to the axis of the specimen, and the dark zone intercepted from light by the specimen 2 and the light zone where light is directly reached are projected on an enlarged scale on a solid state photo diode linear array 30 surface whereby the deformation is measured by the ratio of the light zone L to the dark zone D. In this case a single camera incorporates two solid state photo diode linear arrays, and it is also possible to use two pairs of independent deformation measuring cameras provided with telescopic lenses and filters.

In the case of using two deformation measuring cameras, an output is done with the digital output signal responsive to the deformation by adding the outputs of respective data processors 16. Said output and the digital signal output of a digital thermometer are inputted into a personal computer 18 through a personal computer interface 17 by means of a program prepared by general procedures, the storage is operated, and the relationship between the temperature and the thermal expansion coefficient is drawn in a curve by a digital plotter 20.

In the means of measuring the thermal expansion coefficient according to the invention, telescopic lenses 14 which read out a very little deformation of the specimen 2 need to be mounted away from the electric furnace to prevent a thermal affection, and therefore the lenses whose free working distance (the distance from the tip of lens to the article to be measured) is in the range 200–700 mm (preferably 300–500 mm) and whose F number is in the range 5–8 is applied. Further, the lens is only of 5 to 10 magnifications, and with these magnifications the present apparatus can detect the deformation of even 1 $\mu$m at the end. If the working distance is shorter than that range, the telescopic lenses 14 must be brought closely to the electric furnace 1 at high temperature thereby to cause a measuring error affected by temperature.

In the apparatus of measuring the thermal expansion coefficient according to the invention, as a countermeasure therefor there have been manufactured the telescopic lenses 14 to satisfy the conditions of composite lens × 10 times and the free working distance in the range 200–700 mm, thereby enabling it to measure the deformation in 1 $\mu$m unit.

The telescopic lens 14 used for the object as in the present invention needs a magnification ratio of some ten times to detect delicate dimensional changes of specimen and it is usually of very large size. However, the present apparatus is featured by the realization of detection of subtle dimensional changes (even in 1 $\mu$m precision in the embodiments as described herein) at a low magnification ratio by precisely reading through interpolation of the pixels and the pitch.

Figure 15:
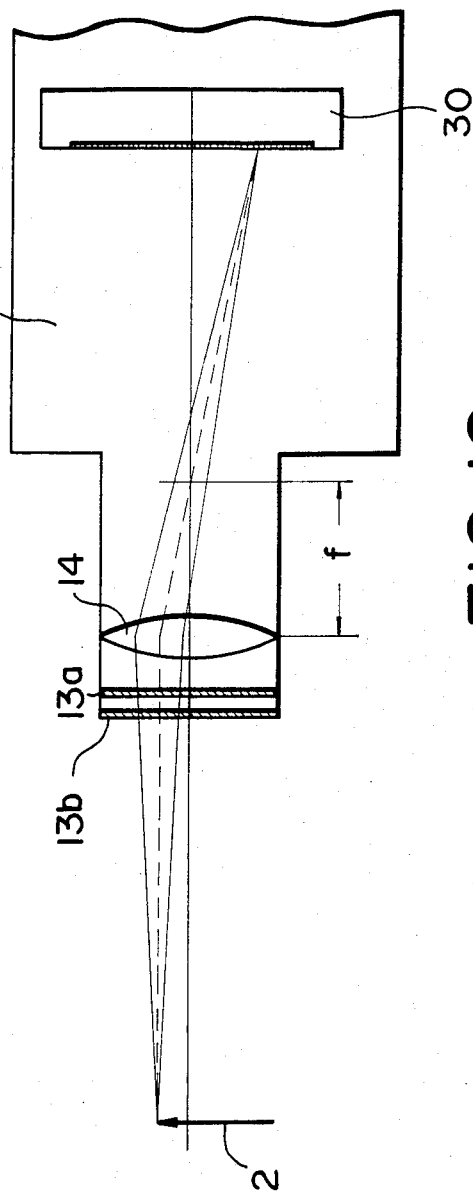
FIG. 15 shows an arrangement of the lens system of camera section and the photo diode linear array, as well as an optical pass, in which the change of the focussing point on said array 30 corresponds to the dimensional change of the specimen 2.

As shown in FIG. 15, the end of the measuring specimen 2 forms light and dark shadows on the photo diode array sensor 30. An image is detected as a video signal, and the lengths of light and dark shadows are computed when the change of the position or the dimension of said specimen 2 is measured. The circuit includes the functions of the pixels interpolation, and it is possible to measure the length of the binary signal i.e. the lengths of the light and dark zones more finely specializing than in the pitch of pixel which constitutes the array.

Figure 16:
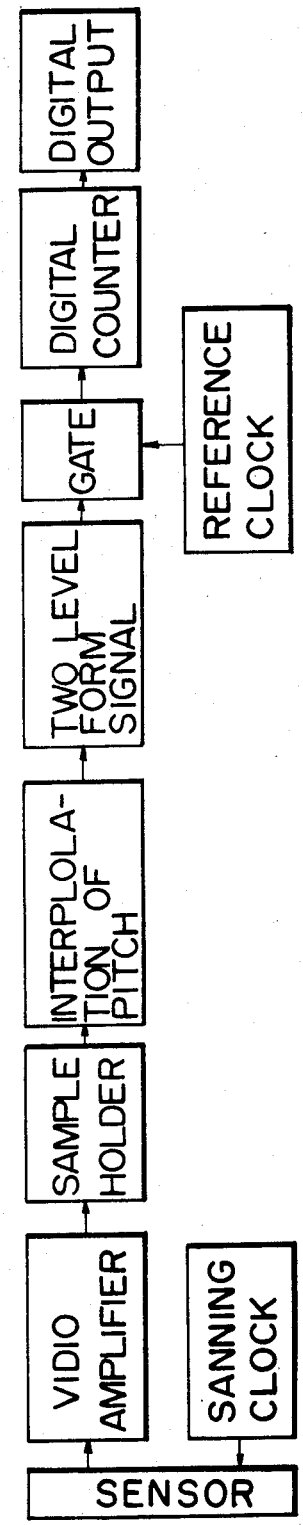
FIG. 16 shows a block diagram of an electric circuit which processes the video signal obtained from the photo diode array.
Figure 17:
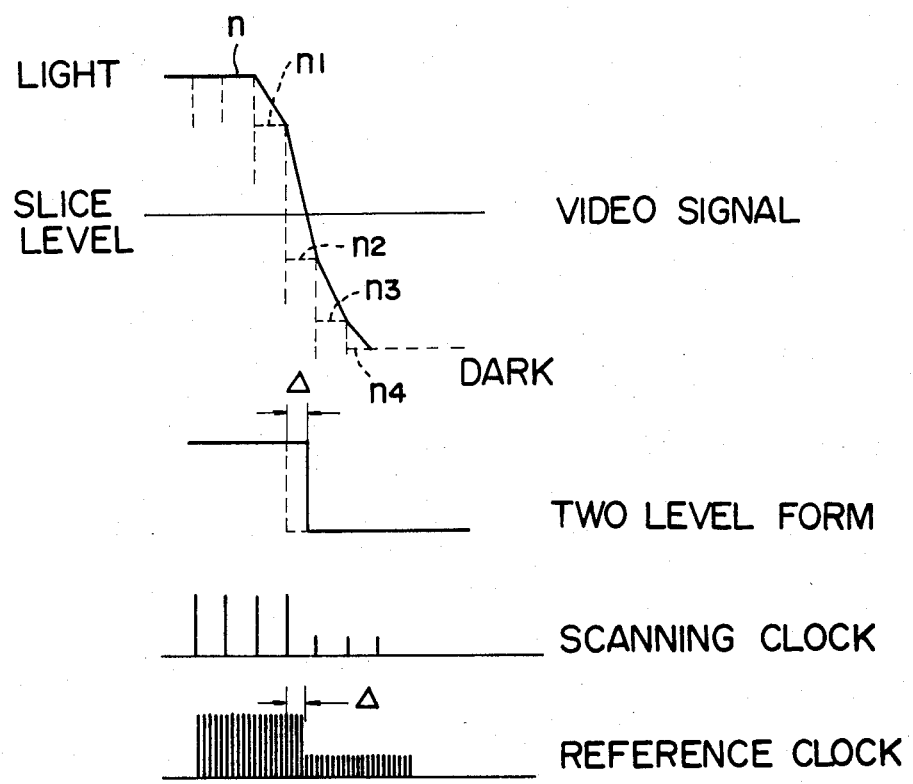
FIG. 17 shows a principle (interpolation of pitch) in which by connecting of the output of each of pixels the deformation smaller than the pitch of pixel is detected.

In the ordinary measurement according to a photo diode linear array, the lengths of the light and dark zones are measured by producing a binary signal, fixing a slice level, from the sample-held, step-shaped video wave configurations of pixel output shown with n, $n_1$, $n_2$, . . . as shown with the dotted line in FIG. 17. Whereas according to the present invention, the step-shaped, sample-held signals are further connected thereby to produce a video signal as shown with the solid line in FIG. 17, and by making said video signal binary detection is made to the change of the signal length, which includes the output change of $n_1$, $n_2$ pixels, that is the change $\Delta$ (delta) smaller than the pitch of pixels shown in FIG. 17, to allow the measuring resolving power to be improved. At this time, if the reference clock signal shown in FIG. 16 is higher in frequency than the scanning clock signal of the diode array and if the frequency is five times as is proved in the clock related drawing at the lower portion of FIG. 17, it is possible to detect the change of the specimen 2 by finely specializing it to 1/5 length of the pitch of pixels. This is the very effect of interpolation, and thanks to this effect it becomes capable of having a sensor of 1,000 pixels have a dimension measuring resolving power same as in a sensor of 5,000 pixels thereby obtaining a rapid improvement of accuracy.

One of the features of the present invention is that as described above, measurement of 1 $\mu$m precision can be carried out with a lens magnification of only about ten times whereby the entire apparatus could be of small size.

FIG. 1 shows an embodiment in which two cameras are arranged in parallel so as to measure both the ends of a specimen. Since the measuring resolving power is 1 $\mu$m as described above said power for the object to be measured becomes 0.001% if the distance between the two cameras is taken 100 mm. This percentage is an epoch-making numerical value which could not be obtained in conventional processes. The distance between the cameras can be varied by the known transfer mechanism 31 as shown in FIG. 1, so that the specimen is not limited in size.

Figure 4:
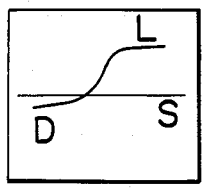
FIG. 4 shows an oscilloscope wave configuration of the image including the radiant light of the specimen to be measured, which light is sensed by solid scanning photo diode elements.
Figure 5:
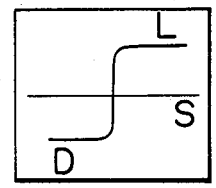
FIG. 5 shows an oscilloscope wave configuration in which the difference between the light zone and the dark zone has become clear to have removed the radiant light of the heated specimen by using filter.

On the other hand, the specimen 2 within the electric furnace 1 emits radiant light (visual light) from itself when the temperature rises above 700° C. That is, the solid state photo diode linear arrays used for measuring the deformation has sensitivity to all radiant light from the specimen, so that like the wave configuration of an oscilloscope 23 shown in FIG. 4 it is scarcely possible to produce a difference between the light zone L and the dark zone D in the solid state photo diode linear arrays surface and it is difficult to make measurement at the time of high temperature. To solve this problem many filters of illuminating the light from the specimen has been researched from various angles, and as a result there has been found filters which completely removes the radiant light emitted from the specimen, and then transmit only lighting light. Said filter is constituted by a couple of filters, and its object is to prevent the radiant light from incidence into the cameras even when the specimen has reached the predetermined high temperature. This takes advantage of the difference of the wave length property of said lighting light and the wave length property of the radiant light of the specimen, and because of this filter property the lighting light only makes incidence into the cameras. For example, one (13a) of the two filters is a 0.8 $\mu$m infrared ray cutting filter while the other (13b) is a neutral density filter.

Thus the infrared ray in the radiant light from the specimen is to be removed by the filter 13a and the visible light in the radiant light is to be removed by the filter 13b. In the present embodiment the illuminator 9 is required to sufficiently emit the light of the wave length less than 0.8 $\mu$m, said light having a high brightness and a color temperature. For this reason it becomes possible to form, making a sufficient contrast, an image based on the lighting light, to the solid light-receiving elements, irrespective of the heating temperature of the article to be measured, when the automatic measurement of temperatures from the room temperature to 2,000° C. becomes possible. This is the great characteristic feature of the present invention.

As light source there is used incandescent lamp, xenon lump, halogen lamp or laser beam, but from the view points of simple installation and easy handling it will be preferable to combine in use incandescent lamp with a voltage adjustor or halogen lamp with a reflector. In this case, the optical system may be preferably telecentric system. In any case, light is collected by condenser. Preferably, the light may be parallel rays with rectilinear propagation.

Then the invention will be described with reference to measuring examples by means of the thermal expansion coefficient measuring apparatus of the invention.

EXAMPLE 1

Figure 2:
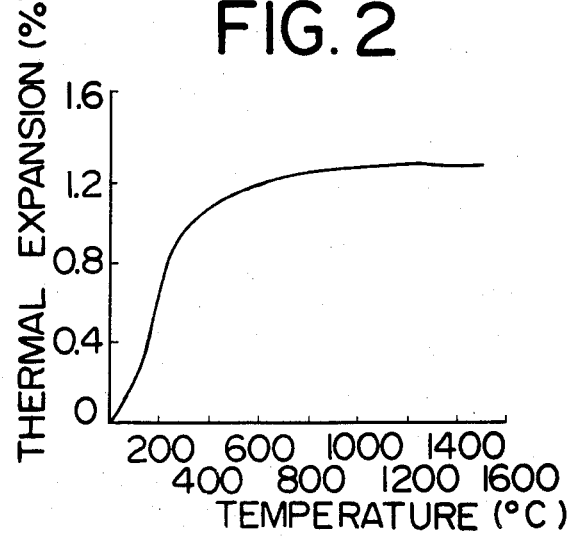
FIG. 2 is a graph showing the relationship between the temperature and the thermal expansion coefficient, based on the means for measuring the thermal expansion coefficient, which is shown in FIG. 1.

A silica brick was used as specimen. A specimen of 20 mm wide $\times$ 15 mm high $\times$ 80-85 mm long was set in an electric furnace 1 of the present system shown in FIG. 1, there were employed telescopic lenses 14 in which the free working distance is 480 mm and the F number is 8 and glass filters 13, the temperature-rising rate was set to 4° C. per minute, the data between room temperature and 1,500° C. were read every 5° C., and there was obtained a relationship between the temperature and the thermal expansion coefficient. The result is shown in FIG. 2.

EXAMPLE 2

In fine ceramics the specimens are in many occasions of small size in general, and the thermal expansion coefficient must be measured often with small-size specimen.

For measuring the displacement of a small-sized specimen there is a method of measuring the deformations of both the ends of the specimen by using a single deformation measuring camera, but with such camera it is possible to measure the deformation of only such small specimen whose dimension is 2–5 mm. On the contrary, to enlarge the measuring area by using lens of low magnification, there takes place a problem that the reading accuracy is extremely lowered.

Figure 3:
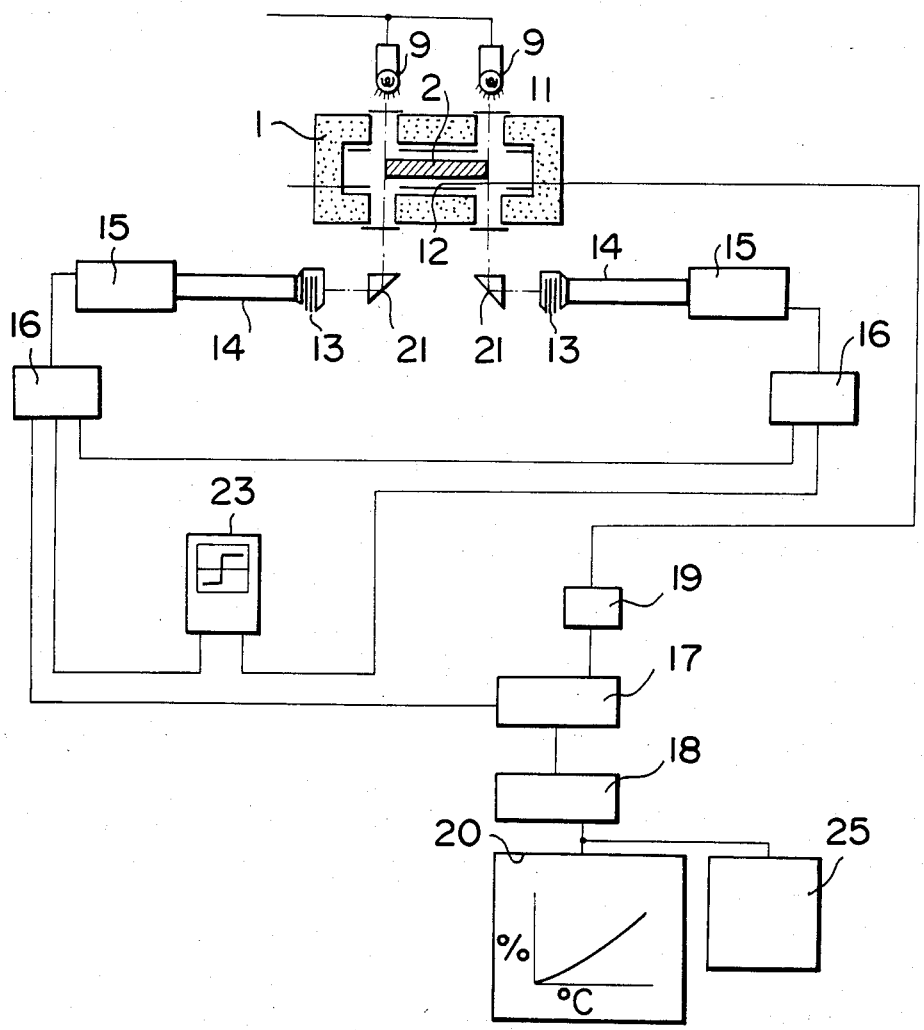
FIG. 3 is a schematic drawing showing another embodiment in which the means for measuring the thermal expansion coefficient, which is similar to that of FIG. 1, is used for small-sized specimen with prism.

An embodiment of applying the thermal expansion coefficient measuring apparatus of the invention to a small-sized specimen of fine ceramics by using prism is now described in detail with reference to FIG. 3.

The deformation of the specimen 2 is measured in such a manner that both the ends of the specimen are illuminated by illuminators 9 from the angle rectangular to the axis of the specimen, an image of the dark zone blocked from the light by the specimen 2 and an image of the light zone directly reached by the light are deflected 90° by prisms 21 arranged at the opposite side of the illuminators 9, said images are then magnified and projected by telescopic lenses 14 on the detection portions of deformation measuring cameras 15 being provided in parallel to the axis of the specimen 2, and the deformation is measured and calculated based on the ratio between the light zone L and the dark zone D.

Figure 6:
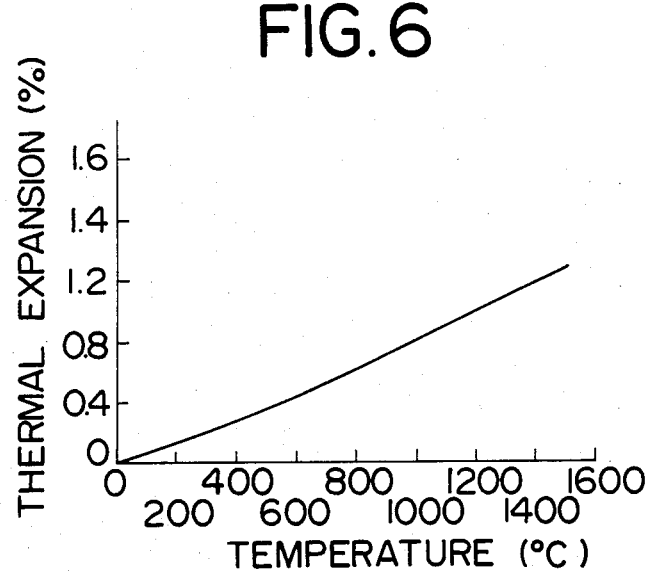
FIG. 6 is a graph showing the relationship between the temperature and the thermal expansion coefficient, based on the apparatus for measuring the thermal expansion coefficient shown in FIG. 3.

A recrystallized alumina specimen containing 99.5% alumina was used. A specimen of 5 mm wide $\times$ 5 mm high $\times$ 45 mm long was set in the electric furnace 1 of the present system shown in FIG. 3. The result is shown in FIG. 6.

EXAMPLE 3

An embodiment of applying the thermal deformation measuring system of ceramics or the like of the present invention to a creep measuring device is then described in detail with reference to FIGS. 7 and 8.

The deformation of the specimen 2 is measured in such a manner that as shown in FIGS. 7 and 8, the specimen-facing sides of upper and lower refractory disks 22 of the specimen 2 are illuminated by the illuminators 9 from the direction rectangular to the axis of the specimen, the dark zone in which light has been blocked by said refractory disks 22 and the light zone to which light has been directly reached, are projected in a magnified state on the detection portions of the deformation measuring cameras by lenses, and the deformation is measured and calculated based on the ratio between the light zone L and the dark zone D.

In this case, the output of the data processors 16 is added thereby to be output by a digital output signal in response to the deformation. This output and the digital signal output of a digital thermometer 19 are inputted into a personal computer 18 through a personal computer interface 17 by a program prepared by general means, the memory is operated, and the relationship between the time and the creep deformation is described in a curve by means of a printer 25 and a digital plotter 20.

Practically, to increase the measuring precision, the upper face of the lower refractory disk 22 and the lower face of the upper refractory disk 22 are measured by using two pairs of illuminators 9, two pairs of telescopic lenses 14 and two pairs of deformation measuring cameras 15, respectively. With smaller height of the specimen 2 it is incapable of arranging in each two pairs of the telescopic lenses 14 and the deformation measuring cameras 15, and therefore in such case it is possible to arrange in parallel each two pairs of the illuminators 9, the telescopic lenses 14 and the deformation measuring cameras 15 at angle diverted to the horizontal direction as shown in FIG. 7.

On the other hand, when the refractory disks 22 laid on the upper and lower portions of the specimen 2 in the electric furnace 1 reaches a temperature above 800° C., infrared rays are emitted from the disks themselves.

To solve this problem, there can be used filters 13 same as those mentioned in the example of said thermal expansion coefficient measuring apparatus, said filters removing the light of the infrared zone.

Also the mechanism of the illuminators 9 is as described above.

Thus the inventors of this invention have succeeded in developing a creep measuring device with which it is possible to read the maximum accuracy up to 1 μm and to measure with high precision from low temperature to high temperature by means of the structure of the present system.

An example of making measurement by the creep measuring device according to the invention will then be described below.

Figure 9:
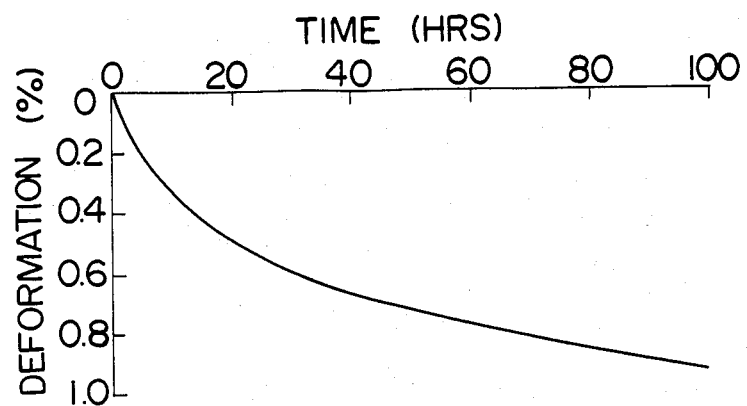
FIG. 9 is a graph showing the relationship between the time and the deformation rate by means of the creep measuring device shown in FIG. 7.

A fireclay brick was used as a specimen. A specimen of 30 mm in diameter×30 mm high was set in the electric furnace 1 of the present system shown in FIG. 7, the temperature within the furnace 1 was raised to 1,300° C. at the rate of 4° C. per minute, then a load of 2 kg/cm² was applied to the specimen by a loading means 24, and immediately thereafter the deformation of the specimen was measured and calculated every 10 minutes by the personal computer 18 by using each two pairs of the illuminator 9 using incandescent lamp, the telescopic lenses 14 wherein the free working distance is 480 mm while the F number is 8 and the glass filters 13 which remove the light of the infrared zone, and the relationship between the time and the deformation was described by the plotter 20. The result is shown in FIG. 9.

EXAMPLE 4

The thermal deformation measuring system of ceramics and the like according to the invention can be used even as a thermal elastic modulus measuring apparatus under the deflecting process, and one embodiment of the apparatus will be described minutely with reference to FIGS. 10 and 11.

Figure 10:
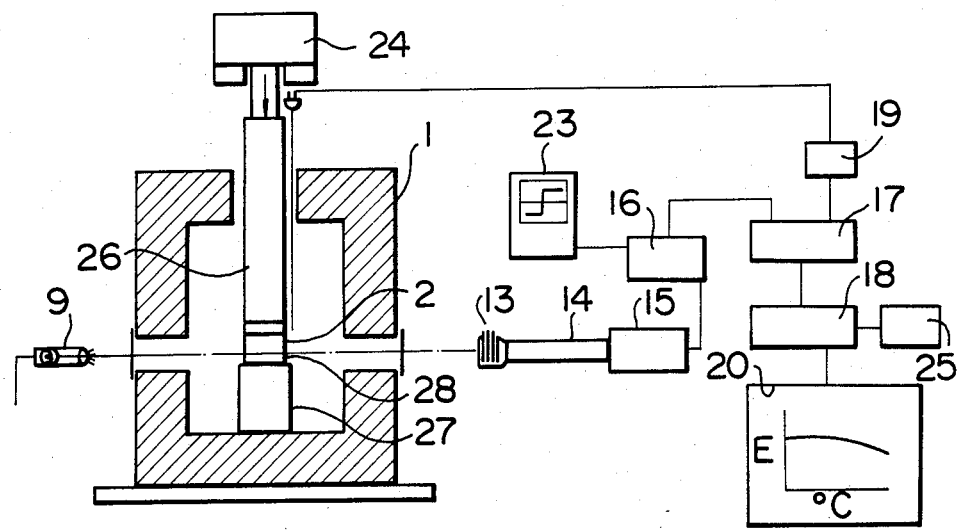
FIG. 10 is a schematic drawing showing the dispositional relation of an embodiment of applying the deformation measuring system of the invention to a thermal elastic modulus measuring apparatus.
Figure 11:
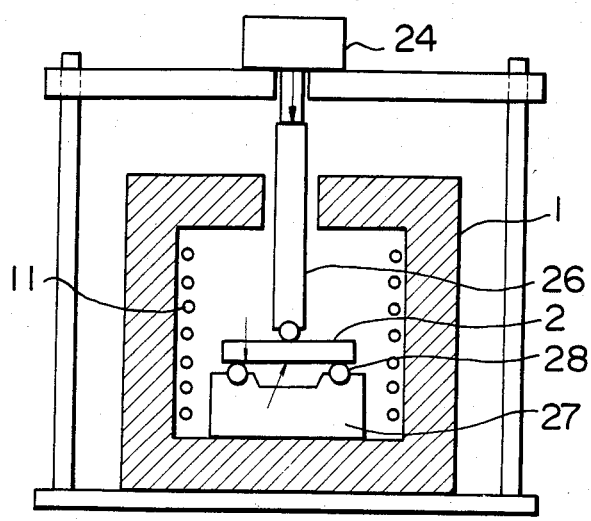
FIG. 11 is a sectional view of the essential portion of FIG. 10.

To explain the thermal elastic modulus measuring apparatus according to said embodiment, referring for example to one in which solid state photo diode linear array is used for the deformation measuring camera 15, the deflection displacement of the specimen 2 is measured in such a way that as shown in FIGS. 10 and 11, the lower portion at the center of said specimen and the portion most close to the contact point of a support roll 28 with the specimen 2 are illuminated by two pairs of illuminators 9 from the direction rectangular to the axis of the specimen, each point is measured by two deformation measuring cameras 15, the dark zone intercepted from light by the specimen 2 and the light zone which light is directly reached are projected in a magnified state on solid state photo diode linear array faces by telescopic lenses 14, and the deformation is measured and calculated based on the ratio between the light zone L and the dark zone D (said illuminator 9 and said deformation measuring camera 15 are shown each by a single unit only). In this case the difference of the output of each data processor 16 is calculated and it is output with a digital output signal in response to the deformation. This output and the digital signal output of a digital thermometer 19 are inputted into a personal computer 18 through a personal computer interface 17 by a program prepared by general means, the memory is operated when the result is printed in a printer 25, and simultaneously a curve of the relationship between the temperature and the elastic modulus is described in said printer 25.

Additionally, even in this thermal elastic modulus measuring apparatus, the mechanisms and various conditions of the telescopic lenses 14, the infrared ray removing filters 13 and the illuminators 9 are mostly same as those of said thermal expansion coefficient measuring apparatus. Further, the same references designate the same members.

An example of measuring the thermal elastic modulus according to the invention will be described.

Figure 12:
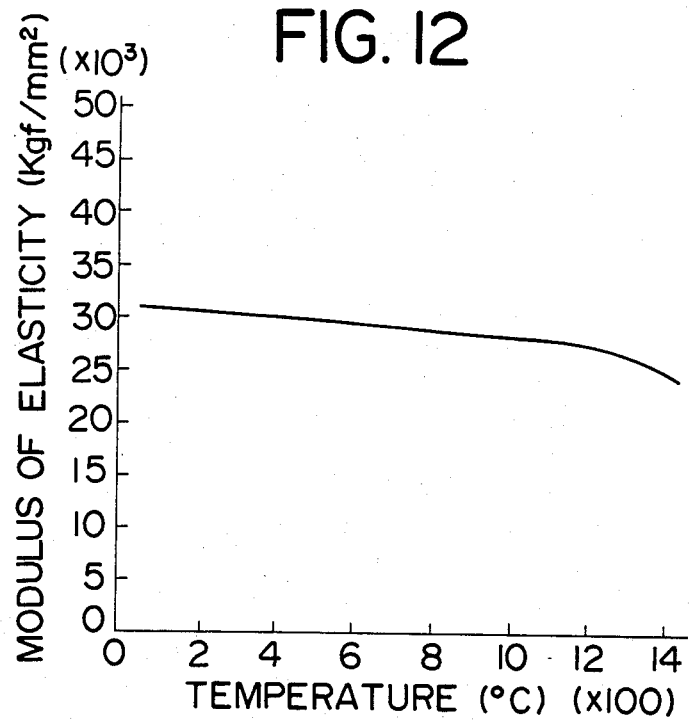
FIG. 12 is a graph showing the relationship between the temperature and the elastic modulus, based on the elastic modulus measuring apparatus.
Figure 13:
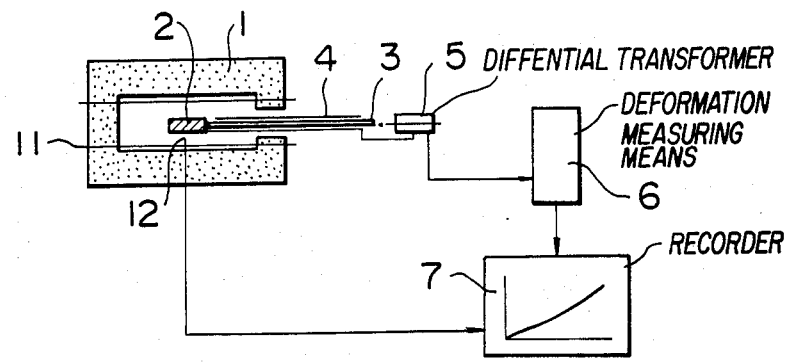
FIGS. 13 and 14 are schematic drawings showing respective known means for measuring thermal expansion coefficient.
Figure 14:
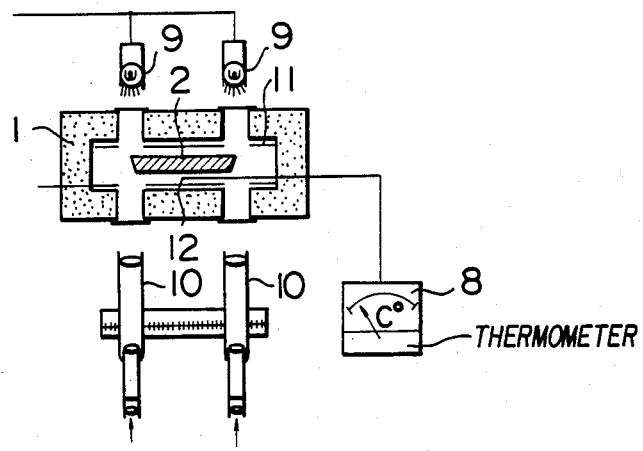

An alumina specimen of 10 mm wide×2.5 mm thick×60 mm long was set on an alumina-made supporting base 27 and supporting rolls 28 in an electric furnace 1 of the present system as shown in FIG. 10, and the specimen was applied with a load corresponding to 50–70% of the breaking strength of the specimen by a loading rod 26 of oil pressure loading means 24 provided outside the furnace, under 3-point bending system every 100° C. up to 1,500° C. At that time, the deformation immediately below the loaded point of the specimen 2 and the deformation most close to the contact point of the supporting roll 28 and the specimen 2 were measured being photographed in cameras incorporating solid state photo diode linear arrays therein by using telescopic lenses 14 wherein the free working distance is 460 mm and the F number is 8 and glass filters 13 which remove the light of the infrared zone, and the relationship between the temperature and the elastic modulus (E) was described based on the following calculation equation. The result is shown in FIG. 12.
Calculation equation:

$$E = \frac{l^3(P)}{4Wt^3y} \text{ (kgf/mm}^2\text{)}$$

P: Load (kgf)
l: Distance (mm) between supporting rolls
W: Width (mm) of the specimen
t: Thickness (mm) of the specimen
y: Displacement rate (mm) of the loading point As described above in detail, the present invention relates to an apparatus for measuring the thermal deformation of specimens, and the apparatus is epoch-making one as the apparatus in which the temperatures from the room temperature to 2,000° C. can be continuously measured and the deformation can be measured at 1 μm unit. When measurement is done with two cameras arranged in parallel the measuring resolving power reaches up to 0.001%, and such a precise measurement is a great characteristic feature of the measuring apparatus of this invention. Although examples of measuring expansion coefficient and creep are described as embodiments, the present apparatus can be applied not being limited to the above embodiments, and it is capable of widely using the present apparatus for measuring the thermal changes in dimension and shape of the specimens to be measured.

We claim:

1. An apparatus for automatic measuring thermal dimensional change from the room temperature to 2,000° C., comprising means for supporting a specimen of the material to be tested and heating said specimen, measuring means for measuring the dimensional change of the specimen during heating of said specimen, said measuring means having a photo diode linear array and a telescopic lens for forming an image of the heated specimen, means for illuminating the specimen from the opposite side of the photo diode linear array, said illuminating means having an electric lamp and a condensor lens, the radiation characteristic curve of said lamp being different from that of the heated specimen, means for separating the light-forming image from the light radiated from said heated specimen, said separating means having a light filter and a neutral density filter between said specimen and and said lens and means for processing and calculating a video signal from signals from the photo diode linear array having a predetermined pitch, said photo diode linear array having the image processing unit interpolating the pixel pitch to increase measuring accuracy.

2. An apparatus according to claim 1, further comprising measuring both the ends of the specimen placed in parallel to the measuring line by a pair of deformation measuring cameras located on an adjustable table so as to be able to measure a specimen over a measuring range limited for one camera thereby to obtain a thermal expansion coefficient.

3. An apparatus according to claim 1 wherein a specimen holder consists of a supporting base, lower and upper refractory disks and a loading bar, and specimen for measuring creep is vertically retained between said lower refractory disk and said upper refractory disk.

4. An apparatus according to claim 1 further comprising a supporting base for measuring the thermal elastic modulus, which is equipped on its upper face with two supporting rolls.

5. An apparatus according to claim 1 further comprising reflective means positioned in the path of the light beam from said illuminating means for optically aligning said means reflecting said light beam to said measuring means.

* * * * *